(12) United States Patent
Walters et al.

(10) Patent No.: US 11,610,419 B2
(45) Date of Patent: *Mar. 21, 2023

(54) SYSTEMS AND METHODS FOR COMPARING LEGAL CLAUSES

(71) Applicant: Capital One Services, LLC, McLean, VA (US)

(72) Inventors: Austin Walters, Savoy, IL (US); Jeremy Edward Goodsitt, Champaign, IL (US); Fardin Abdi Taghi Abad, Seattle, WA (US); Mark Watson, Urbana, IL (US); Vincent Pham, Champaign, IL (US); Anh Truong, Champaign, IL (US); Kenneth Taylor, Champaign, IL (US); Reza Farivar, Champaign, IL (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 42 days.

This patent is subject to a terminal disclaimer.

(21) Appl. No.: 17/337,764

(22) Filed: Jun. 3, 2021

(65) Prior Publication Data
US 2021/0295037 A1 Sep. 23, 2021

Related U.S. Application Data

(63) Continuation of application No. 16/705,390, filed on Dec. 6, 2019, now Pat. No. 11,030,451, which is a
(Continued)

(51) Int. Cl.
*G06F 40/194* (2020.01)
*G06V 30/418* (2022.01)
*G06Q 50/18* (2012.01)

(52) U.S. Cl.
CPC .......... *G06V 30/418* (2022.01); *G06F 40/194* (2020.01); *G06Q 50/184* (2013.01)

(58) Field of Classification Search
CPC .................................................. G06Q 50/184
(Continued)

(56) References Cited

U.S. PATENT DOCUMENTS 8,196,030 B1\* 6/2012 Wang ..................... G06V 30/40
715/251
10,019,438 B2 7/2018 Audhkhasi et al.
(Continued)

OTHER PUBLICATIONS

L. Yongzhong, W. Rushan, X. Jing, Y. Ge and Z. Bo, "Intrusion Detection Method Based on Fuzzy Hidden Markov Model," 2009 Sixth International Conference on Fuzzy Systems and Knowledge Discovery, Tianjin, 2009, pp. 470-474, doi: 10.1109/FSKD.2009.79. (Year: 2009) (Year: 2009 (Year: 2009) (Year: 2009).\*
(Continued)

*Primary Examiner* — Bharatkumar S Shah
(74) *Attorney, Agent, or Firm* — Troutman Pepper Hamilton Sanders LLP; Christopher J. Forstner

(57) ABSTRACT

A system for performing one or more steps of a method is disclosed. The method includes receiving a first legal clause, generating, using a segmentation algorithm, a first hidden Markov chain comprising a plurality of first nodes based on the first legal clause, each of the plurality of first nodes corresponding to an element of the first legal clause, generating, using the segmentation algorithm, a second hidden Markov chain comprising a plurality of second nodes based on the second legal clause, each of the plurality of second nodes corresponding to an element of the second legal clause, comparing each of the plurality of first nodes with each of the plurality of second nodes to identify a difference for each of the plurality of first nodes, determine, based on the comparison, whether the difference for each of the plurality of first nodes exceeds a predetermined difference threshold.

20 Claims, 10 Drawing Sheets

Related U.S. Application Data continuation of application No. 16/382,086, filed on Apr. 11, 2019, now Pat. No. 10,565,445.

(58) Field of Classification Search
USPC .............................................................. 704/4
See application file for complete search history.

(56) References Cited

U.S. PATENT DOCUMENTS

| | | |
|---|---|---|
| 2011/0055206 A1 | 3/2011 | Martin et al. |
| 2013/0086469 A1* | 4/2013 | Lundberg ............ G06F 16/2455 |
| | | 715/255 |
| 2016/0350886 A1* | 12/2016 | Jessen .................. G06Q 50/184 |
| 2017/0200076 A1 | 7/2017 | Vinyals et al. |
| 2019/0005020 A1* | 1/2019 | Gregory ............... G06V 10/457 |

OTHER PUBLICATIONS

Drissi, Y. et al., "PatentAI: IP Infringement Detection with Enhanced Paraphrase Identification," NIPS, Dec. 5, 2018.

Yongzhong, L. et al., "Intrusion Detection Method Based on Fuzzy Hidden Markov Model," 2009 Sixth International Conference on Fuzzy Systems and Knowledge Discovery, Tianjin, 2009, pp. 470-474, doi: 10.1109/FSKD.2009.79 (Year: 2009).

* cited by examiner

SYSTEMS AND METHODS FOR COMPARING LEGAL CLAUSES

CROSS REFERENCE TO RELATED APPLICATIONS

This application is a continuation of, and claims priority under 35 U.S.C. § 120 to, U.S. patent application Ser. No. 16/705,390, filed Dec. 6, 2019, which is a continuation of U.S. patent application Ser. No. 16/382,086, filed Apr. 11, 2019, now U.S. Pat. No. 10,565,445, the entire contents of each of which are fully incorporated herein by reference.

FIELD OF INVENTION

The present disclosure relates to systems and methods for comparing legal clauses, and more particularly to systems and methods that compare legal clauses (e.g., patent claims) using a deep learning model, a neural network (NN), fuzzy matching, or Levenshtein distance and determine whether the legal clauses are different based on the comparison.

BACKGROUND

Legal documents tend to be difficult to read, understand, and compare, often due to the presence archaic jargon or "legalese." As a result, it can be hard for involved parties to understand and compare the implications of various terms or clauses included in their documents or agreements. The analysis is even further complicated by the fact that specific legal terms or clauses could have different implications depending on the location (e.g., jurisdiction) in which they are used. Even for those who can understand complex legal documents, analyzing and comparing the documents can take considerable time and, in turn, expense.

Accordingly, there is a need for systems and methods for providing a comparison of two legal clauses in an efficient way. Embodiments of the present disclosure are directed to this and other considerations.

SUMMARY

Disclosed embodiments provide systems and methods for comparing legal clauses.

Consistent with the disclosed embodiments, various methods and systems are disclosed. In an embodiment, a system performing a method for comparing legal clauses is disclosed. The method may include receiving a first legal clause. The method may include generating a first hidden Markov chain including a plurality of first nodes based on the first legal clause with each of the plurality of first nodes corresponding to an element of the first legal clause. The method may include receiving a second legal clause. The method may include generating a second hidden Markov chain including a plurality of second nodes based on the second legal cause with each of the plurality of second nodes corresponding to an element of the second legal clause. The method may include comparing each of the plurality of first nodes with each of the plurality of second nodes to identify a difference for each of the plurality of first nodes. The method may include determining whether the difference for each of the plurality of nodes exceeds a predetermined difference threshold. The method may include displaying text of the first legal clause in a first color when the difference exceeds the predetermined minimum difference threshold with the first color differing from a default color. The method may include displaying text of the first legal clause in a second color when the difference does not exceed the predetermined minimum difference threshold. The second color may be different from a default color and a first color.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, the term "legalese" refers to the specialized language of the legal profession. The goal of this disclosure is to translate legalese to plain English.

This disclosure discusses a neural network (NN) to translate from the normalized legal clause to a logical rule set. It is envisioned that the NN could be a recurrent neural network (RNN), a convolutional neural network (CNN), a recurrent convolutional neural network (RCNN), or a deep learning neural network.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1:
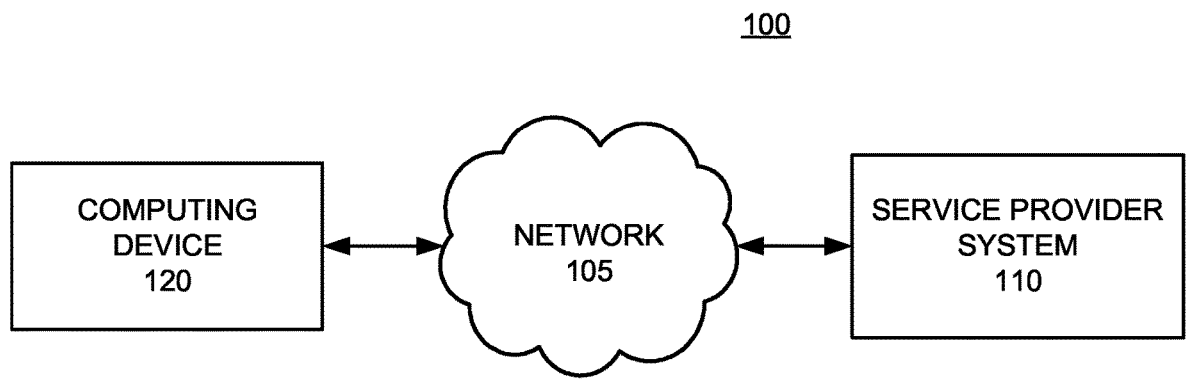
FIG. 1 is a diagram of an example system environment that may be used to implement one or more embodiments of the present disclosure.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system 100 may include a service provider system 110 in communication with a computing device 120 via network 105. In some embodiments, service provider system 110 may also be in communication with various databases. Computing device 120 may be a mobile computing device (e.g., a smart phone, tablet computer, smart wearable device, portable laptop computer, voice command device, wearable augmented reality device, or other mobile computing device) or a stationary device (e.g., desktop computer).

Network 105 may be of any suitable type, including individual connections via the internet such as cellular or WiFi networks. In some embodiments, network 105 may connect terminals using direct connections such as radio-frequency identification (RFID), near-field communication (NFC), Bluetooth™, low-energy Bluetooth™ (BLE), WiFi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
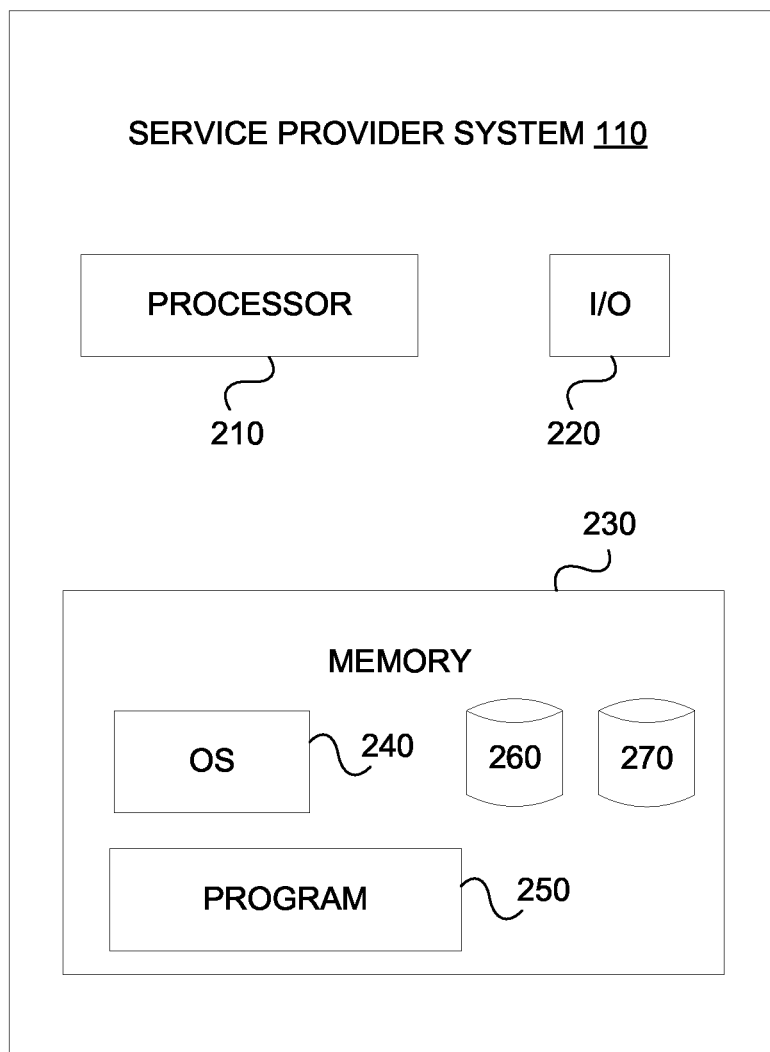
FIG. 2 is a component diagram of a service provider terminal according to an example embodiment.

An example embodiment of service provider system 110 is shown in more detail in FIG. 2. Computing device 120 may have a similar structure and components that are similar to those described with respect to service provider system 110. As shown, service provider system 110 may include a processor 210, an input/output ("I/O") device 220, a memory 230 containing an operating system ("OS") 240 and a program 250. For example, service provider system 110 may be a single server or may be configured as a distributed computer system including multiple servers or computers that interoperate to perform one or more of the processes and functionalities associated with the disclosed embodiments. In some embodiments, service provider system 110 may further include a peripheral interface, a transceiver, a mobile network interface in communication with processor 210, a bus configured to facilitate communication between the various components of the service provider system 110, and a power source configured to power one or more components of service provider system 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, service provider system 110 may configured to remotely communicate with one or more other devices, such as computer device 120. According to some embodiments, service provider system 110 may utilize a NN, word embeddings, a Markov chain, or a probabilistic parser to translate one or more legal clauses from legalese to plain English.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider system 110 may include one or more storage devices configured to store information used by processor 210 (or other components) to perform certain functions related to the disclosed embodiments. In one example, service provider system 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider system 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider system 110 may include memory 230 that may include one or more programs 250 to perform one or more functions of the disclosed embodiments. Moreover, processor 210 may execute one or more programs 250 located remotely from service provider system 110. For example, service provider system 110 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include an image processing database 260 and a neural-network pipeline database 270 for storing related data to enable service provider system 110 to perform one or more of the processes and functionalities associated with the disclosed embodiments.

Service provider system 110 may also be communicatively connected to one or more memory devices (e.g., databases (not shown)) locally or through a network. The remote memory devices may be configured to store information and may be accessed and/or managed by service provider system 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Service provider system 110 may also include one or more I/O devices 220 that may include one or more interfaces for receiving signals or input from devices and providing signals or output to one or more devices that allow data to be received and/or transmitted by service provider system 110. For example, service provider system 110 may include interface components, which may provide interfaces to one or more input devices, such as one or more keyboards, mouse devices, touch screens, track pads, trackballs, scroll wheels, digital cameras, microphones, sensors, and the like, that enable service provider system 110 to receive data from one or more users (such as via computing device 120).

In example embodiments of the disclosed technology, service provider system 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider system 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Figure 3:
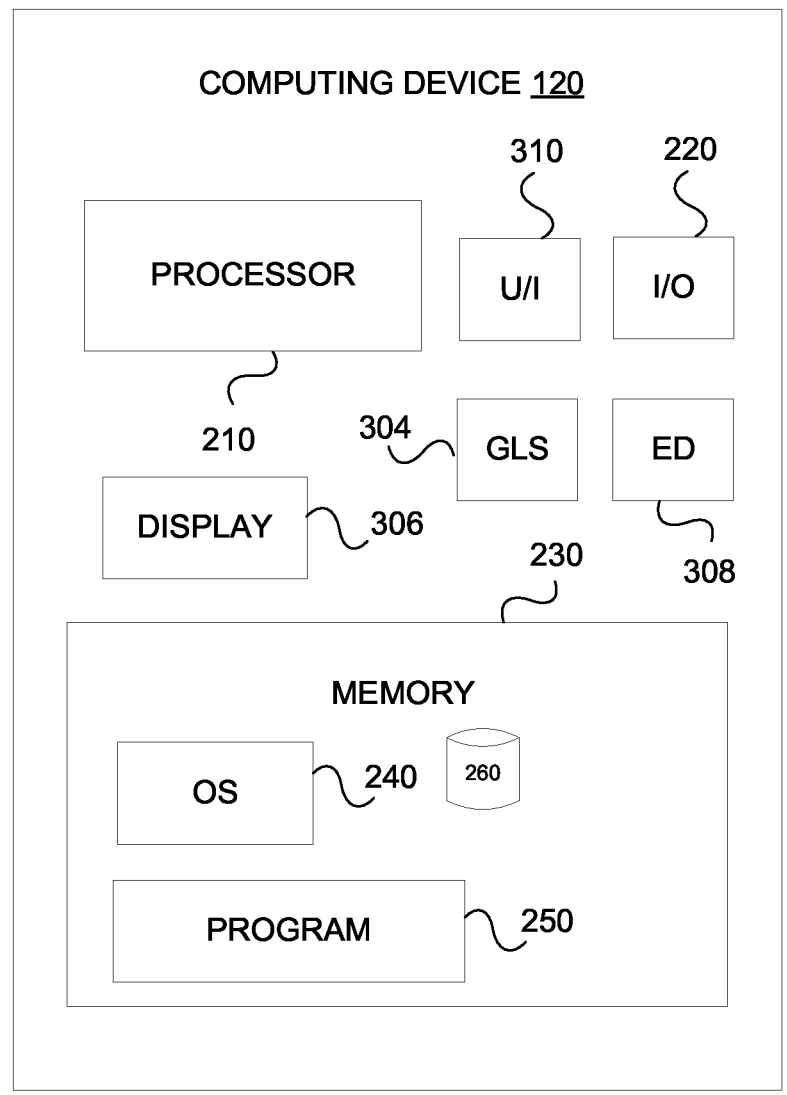
FIG. 3 is a component diagram of a computing device according to an example embodiment.

FIG. 3 shows an example embodiment of computing device 120. As shown, computing device 120 may include input/output ("I/O") device 220 for receiving data from another device (e.g., service provider system 110), memory 230 containing operating system ("OS") 240, program 250, and any other associated component as described above with respect to service provider system 110. Computing device 120 may also have one or more processors 210, a geographic location sensor ("GLS") 304 for determining the geographic location of computing device 120, a display 306 for displaying content such as text (e.g., patent claims or legal clauses), text messages, images, and selectable buttons/icons/links, an environmental data ("ED") sensor 308 for obtaining environmental data including audio and/or visual information, and a user interface ("U/I") device 310 for receiving user input data, such as data representative of a click, a scroll, a tap, a press, or typing on an input device that can detect tactile inputs. User input data may also be non-tactile inputs that may be otherwise detected by ED sensor 308. For example, user input data may include auditory commands. According to some embodiments, U/I device 310 may include some or all of the components described with respect to input/output device 220 above. In some embodiments, environmental data sensor 308 may include a microphone and/or an image capture device, such as a digital camera.

Figure 4A:
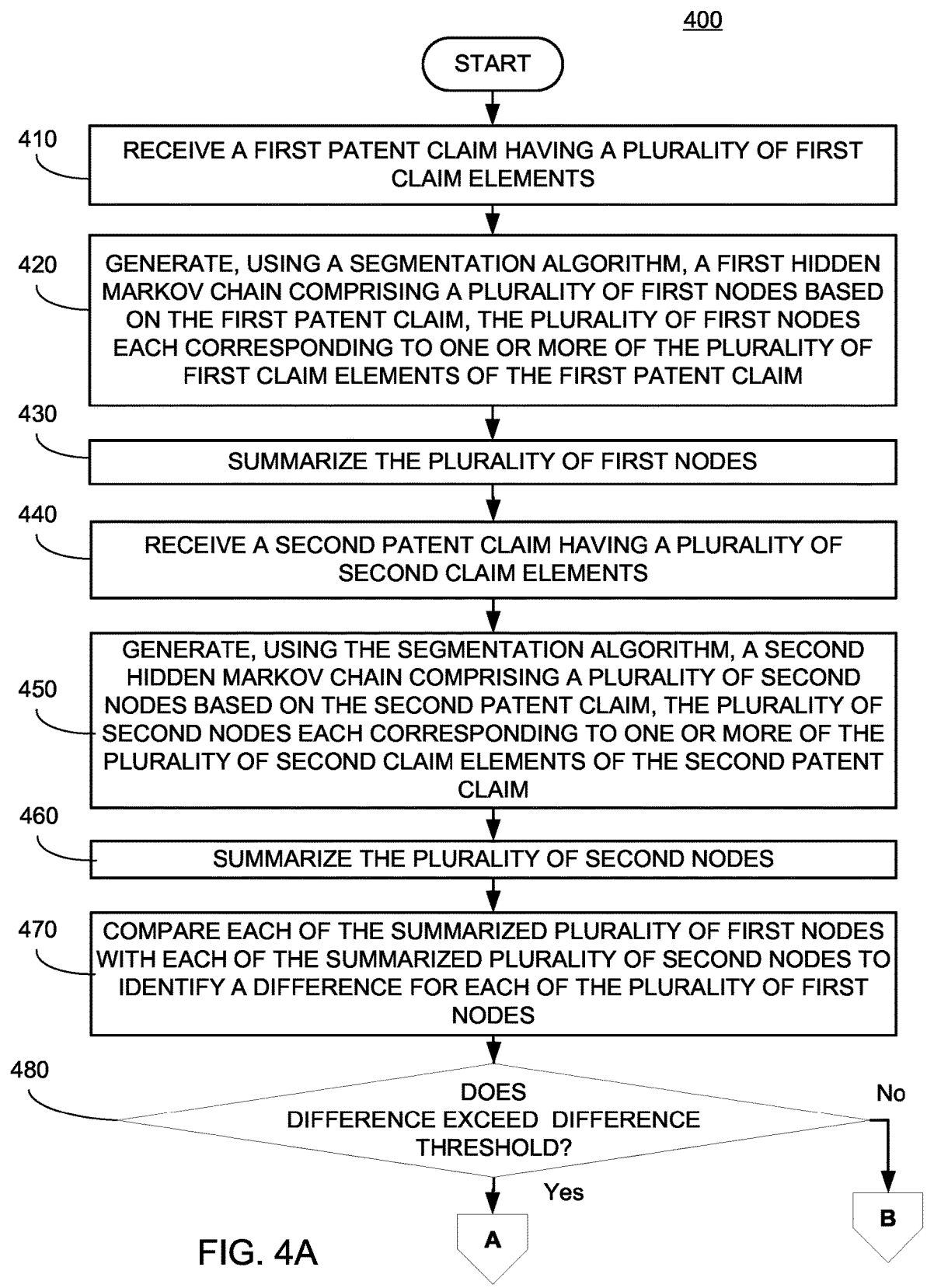
FIG. 4A is a flowchart of a method for comparing legal clauses according to an example embodiment.
Figure 4B:
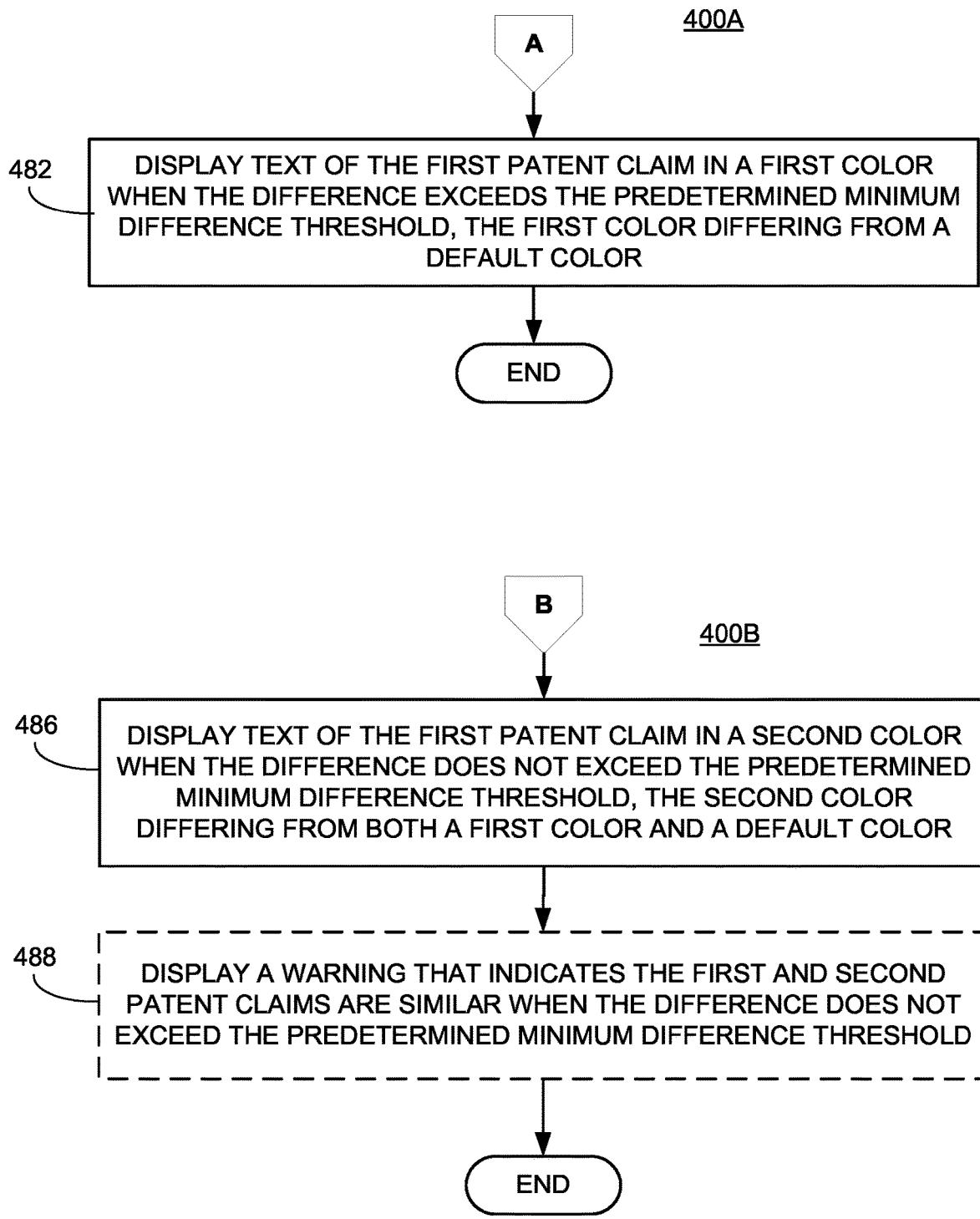
FIG. 4B is a flowchart of a method for comparing legal clauses according to an example embodiment.

FIG. 4A shows a flowchart of a method 400 for comparing two patent claims. FIG. 4B shows a flowchart of methods 400A and 400B for displaying the results of the comparison of two patent claims. Methods 400, 400A, and 400B may be performed by one or more of the service provider system 110 and the computing device 120 of the system 100.

In block 410 of method 400 in FIG. 4A, the system may receive a first patent claim having a plurality of first claim elements. Typically, each claim element is separated by a semicolon or a comma.

In block 420, the system may generate, using a segmentation algorithm, a first hidden Markov chain including a plurality of first nodes based on the first patent claim, the plurality of first nodes each corresponding to one or more of the plurality of first claim elements of the first patent claim. The first hidden Markov chain may be a directed graph that includes one or more arrows associated with one or more nodes. For example, a first first node of the plurality of first nodes may include an arrow connecting to a second first node of the plurality of first nodes. The arrow may between a first first node to a second first node may correspond to a probability of movement from the first first node to the second first node. In some embodiments, each node of the plurality of nodes may correspond to an observable state of the hidden Markov chain, and the plain English meaning of each of the plurality of nodes may correspond to the hidden state of the hidden Markov chain. In some embodiments, the segmentation algorithm may comprise a cascading chunking algorithm to break the first patent claim into a plurality of first nodes corresponding to the plurality of first claim elements. In some embodiments, the segmentation algorithm may implement a hidden Markov chain of order n (i.e., n-gram), wherein n can correspond to any integer number of letters comprising each of the plurality of first claim elements that make up the plurality of first nodes. In some embodiments, the segmentation algorithm may include implementing a cascading chunking algorithm. In some embodiments, a dynamic Bayesian network may be used in place of a hidden Markov chain to model the plurality of nodes.

In block 430, the system may summarize the plurality of first nodes. In some embodiments, summarizing the plurality of first nodes may comprise calculating the state transitions of the plurality of first nodes. Calculating the state transitions of the plurality of first nodes may include training the system on a data set including a plurality of previously examined patent claims in order to estimate transition state probabilities for the first plurality of nodes.

In block 440, the system may receive a second patent claim having a plurality of second claim elements.

In block 450, the system may generate, using the segmentation algorithm, a second hidden Markov chain including a plurality of second nodes based on the second patent claim. The plurality of second nodes each corresponding to one or more of the plurality of second claim elements of the second patent claim. The second hidden Markov chain be a directed graph that includes one or more arrows associated with one or more nodes. For example, a first second node of the plurality of second nodes may include an arrow connecting to a second second node of the plurality of second nodes. The arrow may between a first second node to a second second node may correspond to a probability of movement from the first second node to the second second node. In some embodiments, each node of the plurality of nodes may correspond to an observable state of the hidden Markov chain, and the plain English meaning of each of the plurality of nodes may correspond to the hidden state of the hidden Markov chain. In some embodiments, the segmentation algorithm may comprise a cascading chunking algorithm to break the second patent claim into a plurality of second nodes corresponding to the plurality of second claim elements. In some embodiments, the segmentation algorithm may implement a hidden Markov chain of order n, wherein n can correspond to any integer number of letters comprising each of the plurality of second claim elements that make up the plurality of second nodes. In some embodiments, a dynamic Bayesian network may be used in place of a hidden Markov chain to model the plurality of nodes.

In block 460, the system may summarize the plurality of second nodes. In some embodiments, summarizing the plurality of second nodes may comprise calculating the state transitions of the plurality of second nodes. Calculating the state transitions of the plurality of second nodes may include training the system on a data set including a plurality of previously examined patent claims in order to estimate transition state probabilities for the second plurality of nodes.

In block 470, the system may compare each of the summarized plurality of first nodes with each of the summarized plurality of second nodes to identify a difference in the hidden state (i.e., the plain English meaning) for each of the plurality of first nodes. In an embodiment, the comparison may include fuzzy matching the summarized plurality of first nodes with the summarized plurality of second nodes. Fuzzy matching may help identify whether nodes are similar and not necessarily find exact matches between two nodes of different claim elements. In an embodiment, the comparison may include determining a Levenshtein distance between the summarized plurality of first nodes and the summarized plurality of second nodes. In an embodiment, the comparison may involve the use of a deep learning model or an NN.

In block 480, the system may determine, based on the comparison, whether the difference in the hidden Markov state (i.e., the plain English meaning) for each of the plurality of first nodes exceeds a predetermined minimum difference threshold. For example, the system may determine whether the Levenshtein distance between two particular nodes exceed a predetermined minimum difference threshold. When the difference exceeds the predetermined minimum difference threshold, the system moves to block 482 in method 400A of FIG. 4B. When the difference does not exceed the predetermined minimum, the system moves to block 486 in method 400B of FIG. 4B.

In block 482 of method 400A, the system may display text of the first patent claim in a first color (e.g., green) when the difference exceeds the predetermined minimum difference threshold. The first color (e.g., green) may be different from a default text color (e.g., black).

In block 486 of method 400B, the system may display text of the first patent claim in a second color (e.g., red) when the difference does not exceed the predetermined minimum difference threshold. The second color (e.g., red) may be different from a first color (e.g., green) and a default color (e.g., black).

In block 488 of method 400B, the system may, optionally, display a warning that indicates the first and second patent claims are similar when the difference does not exceed the predetermined minimum difference threshold.

Figure 5A:
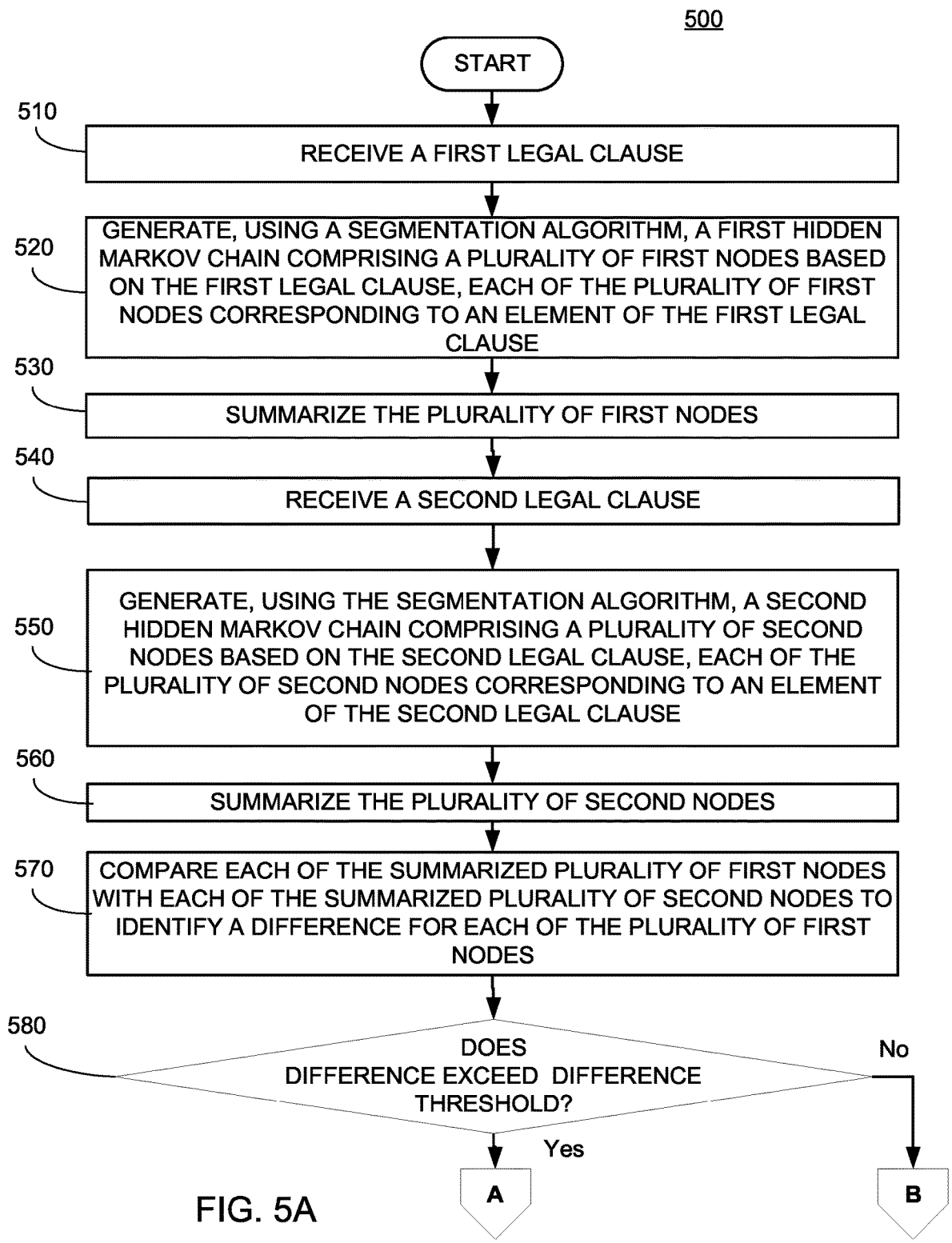
FIG. 5A is a flowchart of a method for comparing legal clauses according to an example embodiment.
Figure 5B:
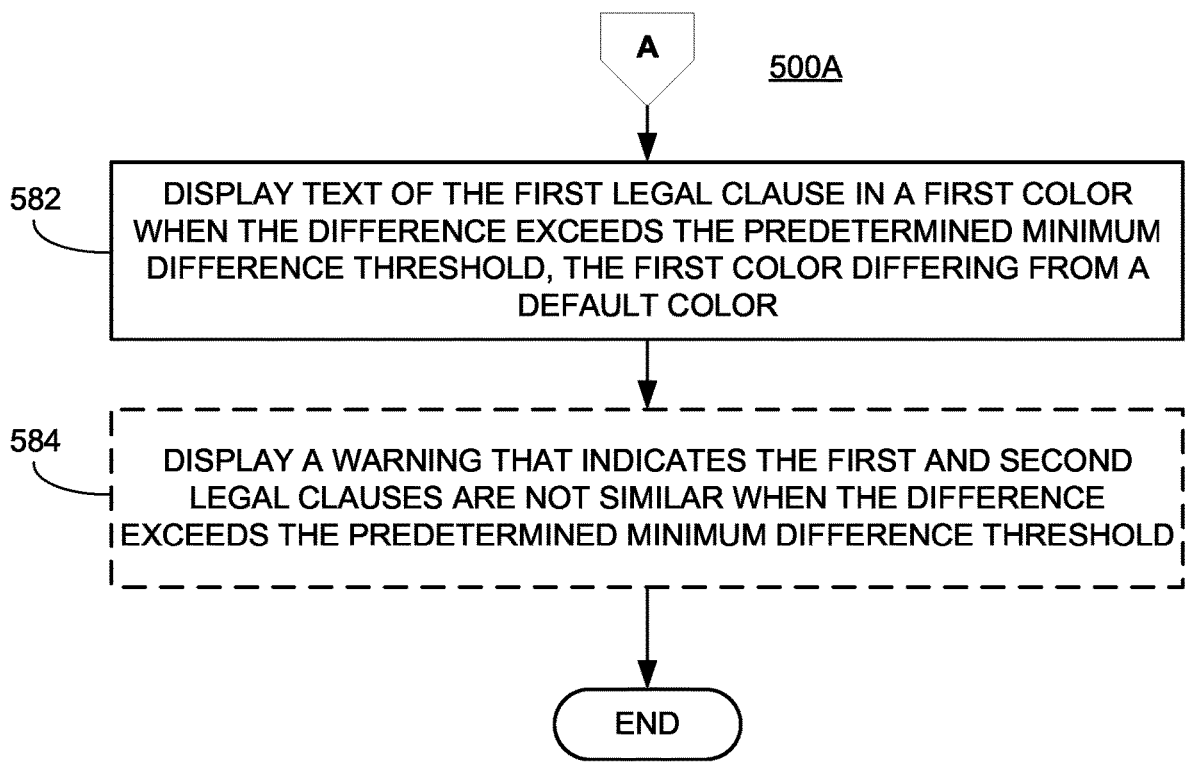
FIG. 5B is a flowchart of a method for comparing legal clauses according to an example embodiment.
Figure 5B:
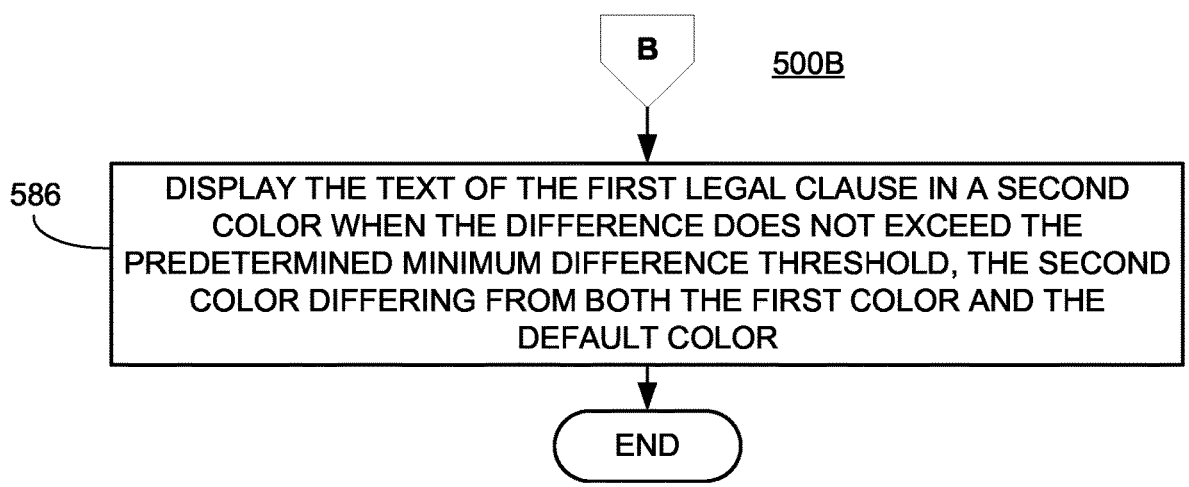

FIG. 5A shows a flowchart of a method 500 for comparing two legal clauses. FIG. 5B shows a flowchart of methods 500A and 500B for displaying the results of the comparison of two legal clauses. Methods 500, 500A, and 500B may be performed by one or more of the service provider system 110 and the computing device 120 of the system 100.

In block 510 of method 500 in FIG. 5A, the system may receive a first legal clause. The first legal clause may be from a legal document such as a contact (e.g., terms of service, assignment, or non-disclosure agreement).

In block 520, the system may generate, using a segmentation algorithm, a first hidden Markov chain including a plurality of first nodes based on the first legal clause. Each of the plurality of first nodes correspond to one or more of the plurality of first claim elements of the first patent claim.

The segmentation of the legal clause into elements may be based off punctuation. For example, an element may correspond to a sentence which is measured by periods. As another example, an element may correspond to a phrase based off of commas, semicolons, or periods. The first hidden Markov chain may be a directed graph that includes one or more arrows associated with one or more nodes. For example, a first first node of the plurality of first nodes may include an arrow connecting to a second first node of the plurality of first nodes. The arrow may between a first first node to a second first node may correspond to a probability of movement from the first first node to the second first node. In some embodiments, each node of the plurality of nodes may correspond to an observable state of the hidden Markov chain, and the plain English meaning of each of the plurality of nodes may correspond to the hidden state of the hidden Markov chain. In some embodiments, the segmentation algorithm may comprise a cascading chunking algorithm to break the first legal clause into a plurality of first nodes corresponding to the plurality of first legal clause elements. In some embodiments, the segmentation algorithm may implement a hidden Markov chain of order n (i.e., n-gram), wherein n can correspond to any integer number of letters comprising each of the plurality of first legal clause elements that make up the plurality of first nodes. In some embodiments, a dynamic Bayesian network may be used in place of a hidden Markov chain to model the plurality of nodes.

In block 530, the system may summarize the plurality of first nodes. In some embodiments, summarizing the plurality of first nodes may comprise calculating the state transitions of the plurality of first nodes. Calculating the state transitions of the plurality of first nodes may include training the system on a data set including a plurality of previously examined legal clauses in order to estimate transition state probabilities for the first plurality of nodes.

In block 540, the system may receive a second legal clause.

In block 550, the system may generate, using the segmentation algorithm, a second hidden Markov chain including a plurality of second nodes based on the second legal clause. Each of the plurality of second node correspond to an element of the second legal clause. Each element may be a sentence of the legal clause. The segmentation of the legal clause into elements may be based off punctuation. For example, an element may correspond to a sentence which is measured by periods. As another example, an element may correspond to a phrase based off commas or semicolons. The second hidden Markov chain may be a directed graph that includes one or more arrows associated with one or more nodes. For example, a first second node of the plurality of second nodes may include an arrow connecting to a second second node of the plurality of second nodes. The arrow may between a first second node to a second second node may correspond to a probability of movement from the first second node to the second second node. In some embodiments, each node of the plurality of nodes may correspond to an observable state of the hidden Markov chain, and the plain English meaning of each of the plurality of nodes may correspond to the hidden state of the hidden Markov chain. In some embodiments, the segmentation algorithm may comprise a cascading chunking algorithm to break the second legal clause into a plurality of second nodes corresponding to the plurality of second legal clause elements. In some embodiments, the segmentation algorithm may implement a hidden Markov chain of order n, wherein n can correspond to any integer number of letters comprising each of the plurality of second claim elements that make up the plurality of second nodes. In some embodiments, a dynamic Bayesian network may be used in place of a hidden Markov chain to model the plurality of nodes.

In block 560, the system may summarize the plurality of second nodes. In some embodiments, summarizing the plurality of second nodes may comprise calculating the state transitions of the plurality of second nodes. Calculating the state transitions of the plurality of second nodes may include training the system on a data set including a plurality of previously examined legal clauses in order to estimate transition state probabilities for the second plurality of nodes.

In block 570, the system may compare each of the summarized plurality of first nodes with each of the summarized plurality of second nodes to identify a difference in the hidden state (i.e., the plain English meaning) for each of the plurality of first nodes. In an embodiment, the comparison may include fuzzy matching the summarized plurality of first nodes with the summarized plurality of second nodes. Fuzzy matching may help identify whether nodes are similar and not necessarily find exact matches between two nodes of different elements of legal clauses. In an embodiment, the comparison may include determining a Levenshtein distance between the summarized plurality of first nodes and the summarized plurality of second nodes. In an embodiment, the comparison may involve the use of a deep learning model or an NN.

In block 580, the system may determine, based on the comparison, whether the difference in the hidden Markov state (i.e., the plain English meaning) for each of the plurality of first nodes exceeds a predetermined minimum difference threshold. For example, the system may determine whether the determined Levenshtein distance for two particular nodes exceed a predetermined minimum difference threshold. When the difference exceeds the predetermined minimum difference threshold, the system moves to block 582 in method 500A of FIG. 5B. When the difference does not exceed the predetermined minimum threshold, the system moves to block 586 in method 500B of FIG. 5B.

In block 582 of method 500A, the system may display text of the first legal clause in a first color (e.g., red) when the difference exceeds the predetermined minimum difference threshold. The first color (e.g., red) may be different from a default color (e.g., black) for the text.

In block 586 of method 500B, the system may display text of the first legal clause in a second color (e.g., green) when the difference does not exceed the predetermined minimum difference threshold. The second color (e.g., green) may be different from a first color (e.g., red) and a default color (e.g., black).

In block 588 of method 500B, the system may, optionally, display a warning that indicates the first and second legal clauses are similar when the difference does not exceed the predetermined minimum difference threshold.

Figure 6A:
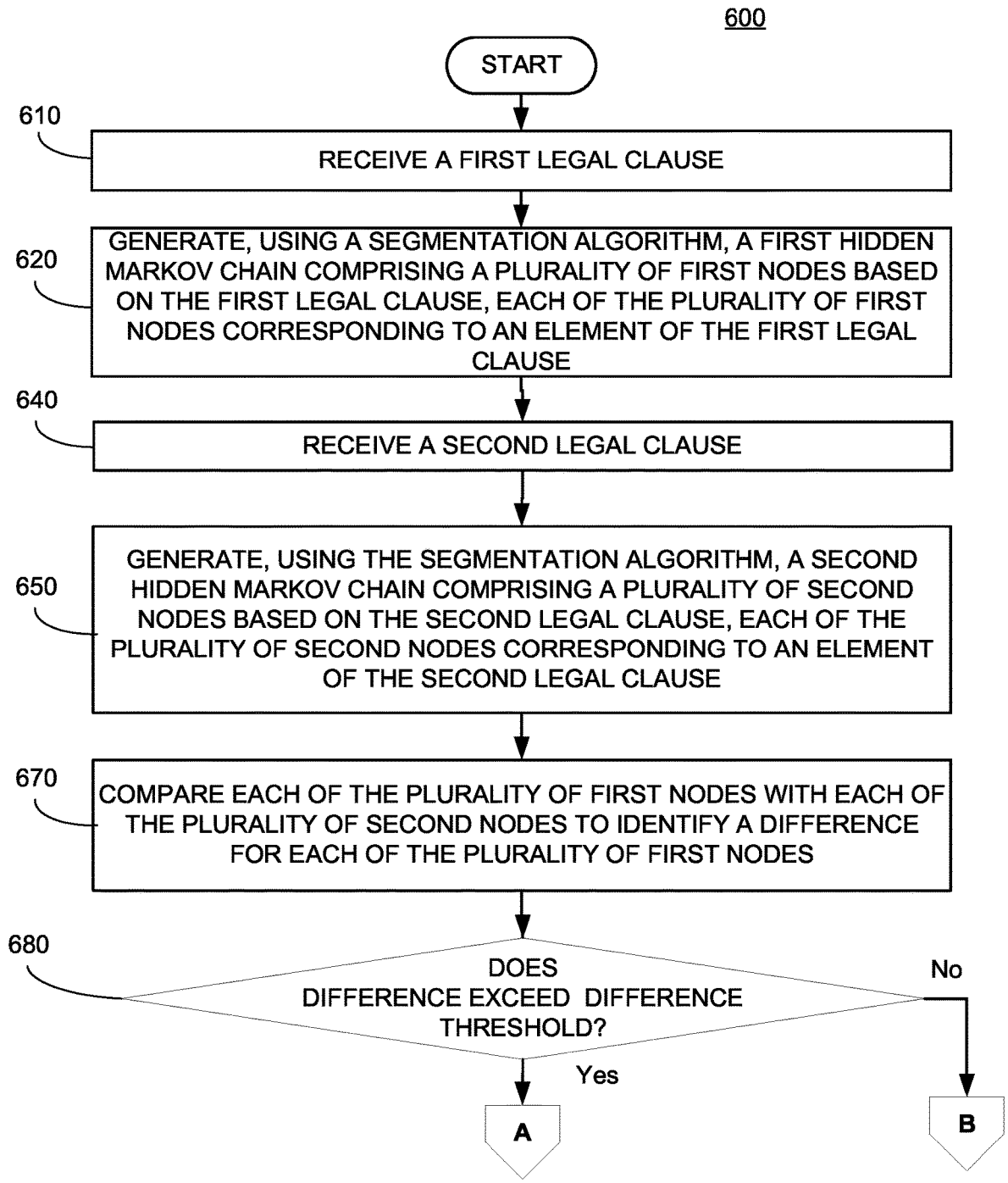
FIG. 6A is a flowchart of a method for comparing legal clauses according to an example embodiment.
Figure 6B:
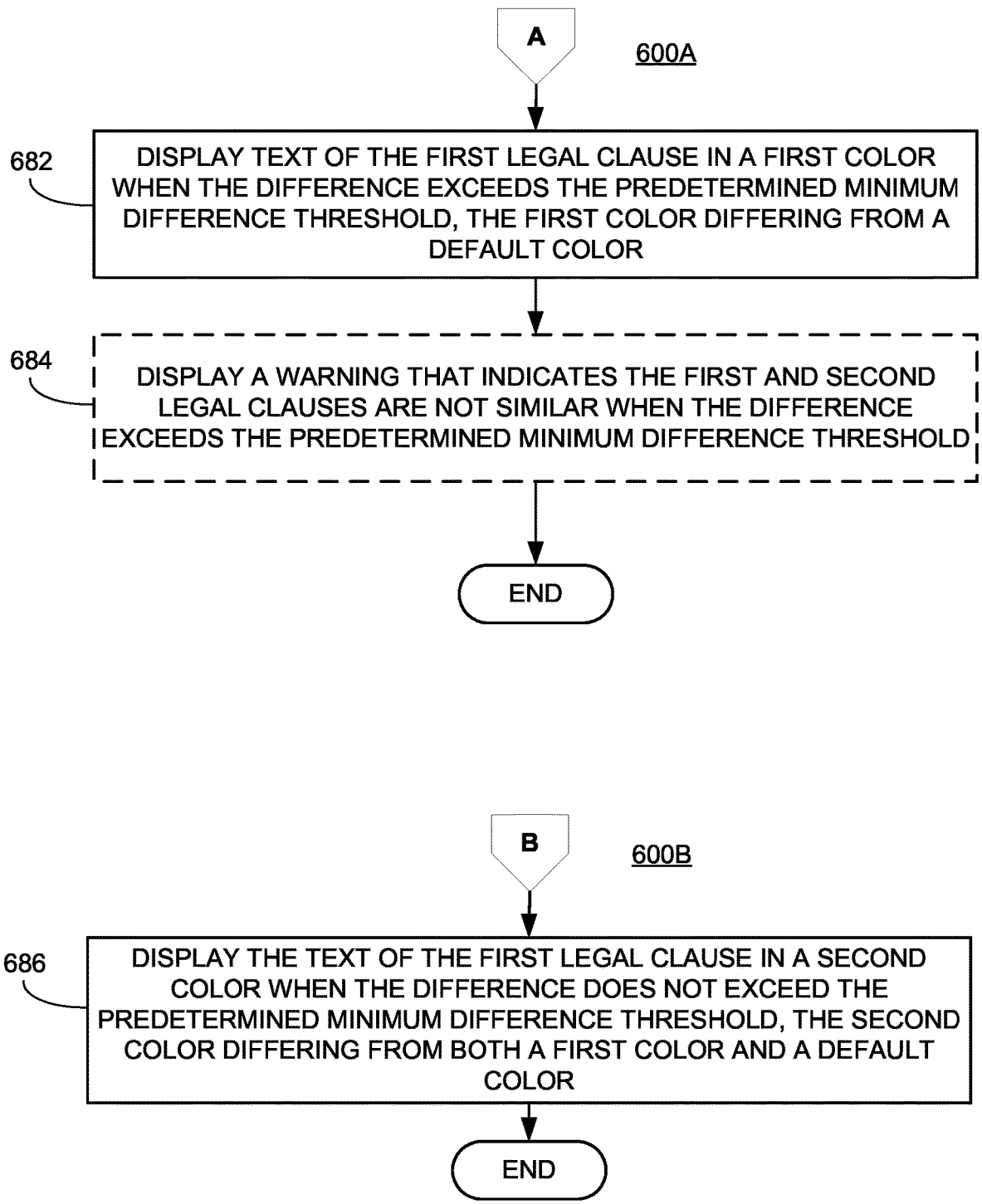
FIG. 6B is a flowchart of a method for comparing legal clauses according to an example embodiment.

FIG. 6A shows a flowchart of a method 600 for comparing two legal clauses. FIG. 6B shows a flowchart of methods 600A and 600B for displaying the results of the comparison of two legal clauses. Methods 600, 600A, and 600B may be performed by one or more of the service provider system 110 and the computing device 120 of the system 100.

In block 610, the system may receive a first legal clause. The first legal clause may be from a legal document such as a contract (e.g., terms of service, assignment, or non-disclosure agreement).

In block 620, the system may generate, using a segmentation algorithm, a first hidden Markov chain including a plurality of first nodes based on the first legal clause. Each of the plurality of first nodes correspond to one or more of the plurality of first claim elements of the first patent claim. The segmentation of the legal clause into elements may be based off punctuation. For example, an element may correspond to a sentence which is measured by periods. As another example, an element may correspond to a phrase based off commas or semicolons. The first hidden Markov chain may be a directed graph that includes one or more arrows associated with one or more nodes. For example, a first first node of the plurality of first nodes may include an arrow connecting to a second first node of the plurality of first nodes. The arrow may between a first first node to a second first node may correspond to a probability of movement from the first first node to the second first node. In some embodiments, each node of the plurality of nodes may correspond to an observable state of the hidden Markov chain, and the plain English meaning of each of the plurality of nodes may correspond to the hidden state of the hidden Markov chain. In some embodiments, the segmentation algorithm may comprise a cascading chunking algorithm to break the first legal clause into a plurality of first nodes corresponding to the plurality of first legal clause elements. In some embodiments, the segmentation algorithm may implement a hidden Markov chain of order n (i.e., n-gram), wherein n can correspond to any integer number of letters comprising each of the plurality of first legal clause elements that make up the plurality of first nodes. In some embodiments, a dynamic Bayesian network may be used in place of a hidden Markov chain to model the plurality of nodes. In some embodiments, segmenting the plurality of first nodes may comprise calculating the state transitions of the plurality of first nodes. Calculating the state transitions of the plurality of first nodes may include training the system on a data set including a plurality of previously examined legal clauses in order to estimate transition state probabilities for the first plurality of nodes.

In block 640, the system may receive a second legal clause.

In block 650, the system may generate, using the segmentation algorithm, a second hidden Markov chain including a plurality of second nodes based on the second legal clause. Each of the plurality of second node correspond to an element of the second legal clause. Each element may be a sentence of the legal clause. The segmentation of the legal clause into elements may be based off punctuation. For example, an element may correspond to a sentence which is measured by periods. As another example, an element may correspond to a phrase based off commas or semicolons. The second hidden Markov chain may be a directed graph that includes one or more arrows associated with one or more nodes. For example, a first second node of the plurality of second nodes may include an arrow connecting to a second second node of the plurality of second nodes. The arrow may between a first second node to a second second node may correspond to a probability of movement from the first second node to the second second node. In some embodiments, each node of the plurality of nodes may correspond to an observable state of the hidden Markov chain, and the plain English meaning of each of the plurality of nodes may correspond to the hidden state of the hidden Markov chain. In some embodiments, the segmentation algorithm may comprise a cascading chunking algorithm to break the second legal clause into a plurality of second nodes corresponding to the plurality of second legal clause elements. In some embodiments, the segmentation algorithm may implement a hidden Markov chain of order n, wherein n can correspond to any integer number of letters comprising each of the plurality of second claim elements that make up the plurality of second nodes. In some embodiments, a dynamic Bayesian network may be used in place of a hidden Markov chain to model the plurality of nodes. In some embodiments, segmenting the plurality of second nodes may comprise calculating the state transitions of the plurality of second nodes. Calculating the state transitions of the plurality of second nodes may include training the system on a data set including a plurality of previously examined legal clauses in order to estimate transition state probabilities for the second plurality of nodes.

In block 670, the system may compare each of the plurality of first nodes with each of the plurality of second nodes to identify a difference in the hidden state (i.e., the plain English meaning) for each of the plurality of first nodes. In an embodiment, the comparison may include fuzzy matching the plurality of first nodes with the plurality of second nodes. In an embodiment, the comparison may include determining a Levenshtein distance between the plurality of first nodes and the plurality of second nodes. In an embodiment, the comparison may involve the use of a deep learning model or an NN.

In block 680, the system may determine, based on the comparison, whether the difference in the hidden state (i.e., the plain English meaning) for each of the plurality of first nodes exceeds a predetermined minimum difference threshold. For example, the system may determine whether the determined Levenshtein distance for two particular nodes exceed a predetermined minimum difference threshold. When the difference exceeds the predetermined minimum difference threshold, the system moves to block 682 in method 600A of FIG. 6B. When the difference does not exceed the predetermined minimum, the system moves to block 686 in method 600B of FIG. 6B.

In block 682 of method 600A, the system may display text of the first legal clause in a first color (e.g., red) when the difference exceeds the predetermined minimum difference threshold. The first color (e.g., red) may be different from a default color (e.g., black) for the text.

In block 686 of method 600B, the system may display text of the first legal clause in a second color (e.g., green) when the difference does not exceed the predetermined minimum difference threshold. The second color (e.g., green) may be different from a first color (e.g., red) and a default color (e.g., black).

In block 688 of method 600B, the system may, optionally, display a warning that indicates the first and second legal clauses are similar when the difference does not exceed the predetermined minimum difference threshold.

Figure 7:
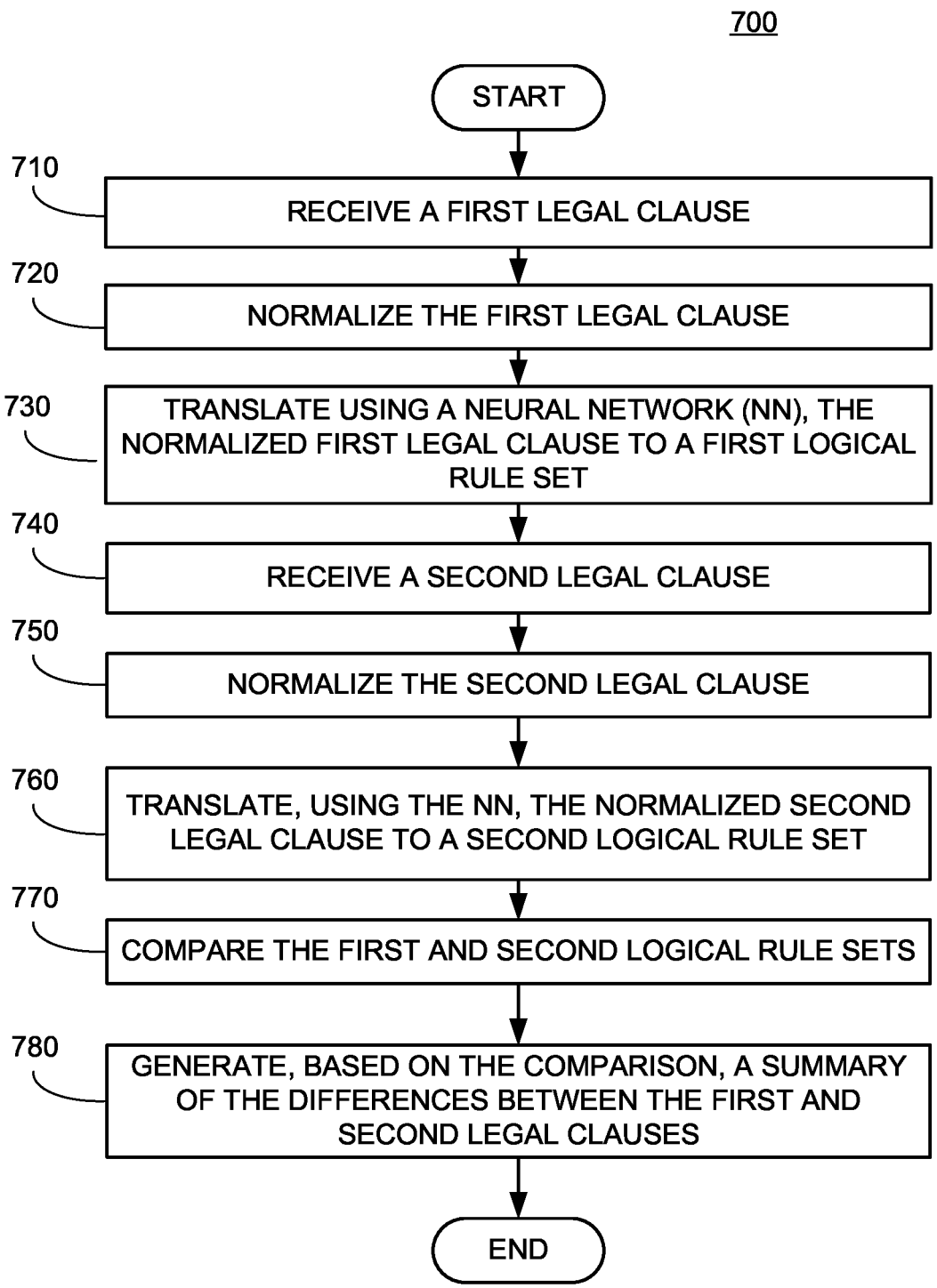
FIG. 7 is a flowchart of a method for comparing legal clauses according to an example embodiment.

FIG. 7 shows a flowchart of a method 700 for comparing two legal clauses. Method 700 may be performed by one or more of the service provider system 110 and the computing device 120 of the system 100.

In block 710, the system may receive a first legal clause. According to some embodiments, the service provider system 110 receives one or more legal clauses or an entire legal document. In other embodiments, the legal clause is received and then recognized as a legal clause rather than a non-legal clause (e.g., a clause from a technical report). In some embodiments, the method may include receiving a document rather than receiving a legal clause. The method may further include the step of identifying a legal clause in the received document. The step of identifying may be performed by an RNN using long short-term memory (LSTM) units or a CNN.

In block 720, the system normalizes the first legal clause. This may include taking number, dates, acronyms, and abbreviations and converting them to full text. For example, "400" would be converted to "four hundred."

In block 730, the system translates the first legal clause, using the NN, to a first logical rule set. In some cases, the service provider system 110 performs the translation. In other cases, the computing device 120 performs translation. In some embodiments, the NN is an RNN. In other embodiments, the NN is a CNN. Finally, in some embodiments, the NN is an RCNN.

Regardless of the type of NN used, the NN will be trained. The training of the NN includes the use of training data, which includes the use of pairs of legal clauses with associated logical rule sets. The NN learns to associate a legal clause to a logical rule set based on receiving numerous legal clauses and logical rule sets. This type of training is done prior to the block 710 and creates a workable NN.

In block 740, the system may receive a second legal clause. Receiving the second legal clause is similar to receiving the first legal clause.

In block 750, the system normalizes the second legal clause. Normalizing the second legal clause is similar to normalizing the first legal clause.

In block 760, the system translates the second legal clause, using the NN, to a second logical rule set. The translation of the second legal clause may be similar to the translation of the first legal clause.

In block 770, the system compares the first and second logical rule sets. For example, the system may perform fuzzy matching on the first and second logical rule sets.

In block 780, the system generates, based on the comparison, a summary of the differences between the first and second legal clauses. The system may generate a redlines version of the first legal clause based on the second legal clause. In addition, or alternatively, the system may generate written explanation of the differences between the first legal clause and the second legal clause.

Certain implementations provide the advantage of easily comparing legal clauses. Thus, making comparing legal documents easier.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Case

The following example use case describes an example of a typical use of comparing two patent claims. It is intended solely for explanatory purposes and not in limitation. In one example, a user receives or generates an electronic version of a patent claim on their portable laptop computer (e.g., computing device 120). Regardless, a user may, via a website on their portable laptop computer (e.g., computing device 120), send or upload the first patent claim to the service provider system 110 for processing. In other words, the service provider system 110 received a first patent claim. The service provider system 110 then generates a first hidden Markov chain including a plurality of first nodes based on the first patent claim, the plurality of first nodes each corresponding to one or more of the plurality of first claim elements of the first patent claim. The service provider system 110 then summarizes the plurality of first nodes. The service provider system 110 receives a second patent claim having a plurality of second claim elements. The service provider system 110 generates a second hidden Markov chain comprising a plurality of second nodes based on the second patent claim, the plurality of second nodes each corresponding to one or more of the plurality of second claim elements of the second patent claim. The service provider system 110 then summarizes the plurality of second nodes. The service provider system 110 then compares each of the summarized plurality of first nodes with each of the summarized plurality of second nodes to identify a difference for each of the plurality of first nodes. The service provider system 110 then determines whether the difference for each of the plurality of first nodes exceeds a predetermined minimum difference threshold. The service provider system 110 may cause the computing device 120 to display text of the first patent claim in a first color (e.g., green) when the difference exceeds the predetermined minimum difference threshold with the first color being different from a default text color (e.g., black). The service provider system 110 may cause the computing device to display text of the first patent claim in a second color (e.g., red) when the difference does not exceed the predetermined minimum difference threshold with the second color being different from both a first color (e.g., green) and a default color (e.g., black). Optionally, the service provider system 110 may cause the computing device 120 to display a warning that indicates the first and second patent claims are similar when the difference does not exceed the predetermined minimum difference threshold.

What is claimed is:

1. A system, comprising:
one or more processors; and
memory in communication with the one or more processors and storing instructions that, when executed by the one or more processors, are configured to cause the system to:
receive a first text comprising a first jargon;
normalize the first text;
translate, using a neural network (NN), the normalized first text to a first logical rule set;
receive a second text comprising a second jargon;
normalize the second text;
translate, using the NN, the normalized second text to a second logical rule set;
compare the first logical rule set and the second logical rule set; and
generate, based on the comparison, a summary of one or more differences between the first text and the second text.

2. The system of claim 1, wherein the instructions, when executed by the one or more processors, are further configured to cause the system to identify the first and second texts within a document.

3. The system of claim 1, wherein the instructions, when executed by the one or more processors, are further configured to cause the system to determine, based on the comparison, whether the one or more differences exceed a predetermined minimum difference threshold.

4. The system of claim 3, wherein the instructions, when executed by the one or more processors, are further configured to cause the system to display the first text in a first color when the one or more differences exceed the predetermined minimum difference threshold, the first color differing from a default color.

5. The system of claim 3, wherein the instructions, when executed by the one or more processors, are further configured to cause the system to display the first text in a second color when the one or more differences do not exceed the predetermined minimum difference threshold, the second color differing from both a first color and a default color.

6. The system of claim 3, wherein the instructions, when executed by the one or more processors, are further configured to cause the system to display a warning that indicates the first and second texts are similar when the one or more differences do not exceed the predetermined minimum difference threshold.

7. The system of claim 1, wherein the instructions, when executed by the one or more processors, are further configured to cause the system to compare the first and second logical rule sets utilizing fuzzy matching.

8. A system, comprising:
one or more processors; and
memory in communication with the one or more processors and storing instructions that, when executed by the one or more processors, are configured to cause the system to:
receive a document comprising a plurality of clauses;
identify a first clause within the plurality of clauses;
normalize, using a neural network (NN), the first clause;
translate, using the NN, the normalized first clause to a first logical rule set;
identify a second clause within the plurality of clauses;
normalize, using the NN, the second clause;
translate, using the NN, the normalized second clause to a second logical rule set;
compare the first logical rule set and the second logical rule set; and
determine, based on the comparison, whether one or more differences between the first and second clauses exceed a predetermined minimum difference threshold.

9. The system of claim 8, wherein the instructions, when executed by the one or more processors, are further configured to cause the system to display text of the first clause in a first color when the one or more differences exceeds the predetermined minimum difference threshold, the first color differing from a default color.

10. The system of claim 9, wherein the instructions, when executed by the one or more processors, are further configured to cause the system to display the text of the first clause in a second color when the one or more differences does not exceed the predetermined minimum difference threshold, the second color differing from both the first color and the default color.

11. The system of claim 9, wherein the instructions, when executed by the one or more processors, are further configured to cause the system to display a warning that indicates the first and second clauses are not similar when the difference exceeds the predetermined minimum difference threshold.

12. The system of claim 8, wherein the instructions, when executed by the one or more processors, are further configured to cause the system to compare the first and second logical rule sets utilizing fuzzy matching.

13. The system of claim 8, wherein the instructions, when executed by the one or more processors, are further configured to cause the system to identify the first and second clauses utilizing a recurrent neural network (RNN).

14. The system of claim 8, wherein the instructions, when executed by the one or more processors, are further configured to cause the system to identify the first and second clauses utilizing a convolutional neural network (CNN).

15. A system, comprising:
one or more processors; and
memory in communication with the one or more processors and storing instructions that, when executed by the one or more processors, are configured to cause the system to:
receive one or more first texts comprising one or more first jargons;
normalize, using a first neural network (NN), the one or more first texts;
translate, using the first NN, the one or more normalized first texts to one or more first logical rule sets;
receive one or more second texts comprising one or more second jargons;
normalize, using the first NN, the one or more second texts;
translate, using the first NN, the one or more normalized second texts to one or more second logical rule sets;
compare the one or more first logical rule sets and the one or more second logical rule sets; and
determine, based on the comparison, whether one or more differences between the one or more first and second texts exceed a predetermined minimum difference threshold.

16. The system of claim 15, wherein the instructions, when executed by the one or more processors, are further configured to cause the system to display the one or more first texts in a first color when the one or more differences exceed the predetermined minimum difference threshold, the first color differing from a default color.

17. The system of claim 16, wherein the instructions, when executed by the one or more processors, are further configured to cause the system to display the one or more first texts in a second color when the one or more differences do not exceed the predetermined minimum difference threshold, the second color differing from both the first color and the default color.

18. The system of claim 15, wherein the instructions, when executed by the one or more processors, are further configured to cause the system to display a warning that indicates the one or more first and second texts are not similar when the one or more differences exceed the predetermined minimum difference threshold.

19. The system of claim 15, wherein the instructions, when executed by the one or more processors, are further configured to cause the system to identify, using a second NN, the one or more first and second texts within a document.

20. The system of claim 19, wherein the second NN is a recurrent neural network (RNN).

\* \* \* \* \*